(12) United States Patent
Peng et al.

(10) Patent No.: US 9,104,263 B2
(45) Date of Patent: Aug. 11, 2015

(54) TOUCH PANEL AND A CONTROL METHOD THEREOF

(71) Applicant: Wistron NeWeb Corp., Hsinchu (TW)

(72) Inventors: Chin-Chun Peng, Hsinchu (TW); Liang-Kai Chen, Hsinchu (TW); Ching-Chia Mai, Hsinchu (TW); Jen-Hao Cheng, Hsinchu (TW)

(73) Assignee: Wistron NeWeb Corp., Hsinchu (TW)

( * ) Notice: Subject to any disclaimer, the term of this patent is extended or adjusted under 35 U.S.C. 154(b) by 53 days.

(21) Appl. No.: 14/041,425

(22) Filed: Sep. 30, 2013

(65) Prior Publication Data

US 2014/0145982 A1 May 29, 2014

(30) Foreign Application Priority Data

Nov. 29, 2012 (TW) .............................. 101144660 A

(51) Int. Cl.
*G06F 3/041* (2006.01)
*G06F 3/044* (2006.01)

(52) U.S. Cl.
CPC .............. *G06F 3/0416* (2013.01); *G06F 3/044* (2013.01); *G06F 3/0418* (2013.01)

(58) Field of Classification Search
None
See application file for complete search history.

(56) References Cited

U.S. PATENT DOCUMENTS

| 7,928,965 | B2 | 4/2011 | Rosenblatt et al. | |
|---|---|---|---|---|
| 2013/0181937 | A1* | 7/2013 | Chen et al. | 345/174 |
| 2014/0092069 | A1* | 4/2014 | Bentov | 345/179 |

FOREIGN PATENT DOCUMENTS

| TW | M368133 | 11/2009 |
|---|---|---|
| TW | M425335 | 12/2011 |
| TW | M423302 | 2/2012 |
| TW | M425335 | 3/2012 |
| TW | M432090 | 6/2012 |

\* cited by examiner

*Primary Examiner* — Joseph Haley
(74) *Attorney, Agent, or Firm* — Muncy, Geissler, Olds & Lowe, P.C.

(57) ABSTRACT

A touch panel control method applied to a touch panel including at least one antenna and a touch sensing structure having a plurality of touch sensing elements is provided. In the touch panel control method, a scan signal is transmitted to at least one of the plurality of touch sensing elements, and a sensing signal sensed by at least one of the plurality of touch sensing elements is received. Whether the at least one antenna starts operating is detected by a control sensor, and if so, operation of a first plurality of touch sensing elements of the plurality of touch sensing elements is stopped, wherein each of the first plurality of touch sensing elements overlaps the at least one antenna.

9 Claims, 5 Drawing Sheets

TOUCH PANEL AND A CONTROL METHOD THEREOF

CROSS REFERENCE TO RELATED APPLICATIONS

This Application claims priority of U.S. Taiwan Patent Application No. 101144660, filed on Nov. 29, 2012, the entirety of which is incorporated by reference herein.

BACKGROUND OF THE INVENTION

1. Field of the Invention

The invention relates to antenna technology, and more particularly to a touch panel combined with antennas.

2. Description of the Related Art

As technologies develop, significance of electronic devices increases with each passing day. Modern electronic devices are designed to be light and handy, and therefore, modules with varying functions may be integrated together to reduce sizes of electronic devices. For example, at least one antenna is combined with a touch panel to function cooperatively. Nevertheless, in a case where at least one antenna is combined with a touch panel, if the touch function and the antenna function are activated simultaneously, interference may occur. Accordingly, avoiding interference is an important issue.

BRIEF SUMMARY OF THE INVENTION

In view of this, the invention provides a touch panel combined with an antenna and a control method thereof. A control sensor is used to detect operation of the antenna. During the period when the at least one antenna is operating, operation of touch sensing elements overlapping the antenna is stopped so as to avoid interference to the antenna.

An embodiment of the invention provides a touch panel control method, applied to a touch panel comprising at least one antenna and a touch sensing structure having a plurality of touch sensing elements, comprising: transmitting a scan signal to at least one of the plurality of touch sensing elements; receiving a sensing signal sensed by at least one of the plurality of touch sensing elements; and detecting whether the at least one antenna starts operating by a control sensor, and if so, stopping operation of a first plurality of touch sensing elements of the plurality of touch sensing elements, wherein each of the first plurality of touch sensing elements overlaps the at least one antenna.

Another embodiment of the invention provides a touch panel, comprising: a touch sensing structure, comprising a plurality of touch sensing elements; at least one antenna; a touch panel controller, coupled to the touch sensing structure, transmitting a scan signal to at least one of the plurality of touch sensing elements and receiving a sensing signal sensed by at least one of the plurality of touch sensing elements; and a control sensor, coupled to the at least one antenna and the touch panel controller, detecting whether the at least one antenna starts operating, wherein when the control sensor detects that the at least one antenna starts operating, the control sensor transmits a control signal to the touch panel controller to make the touch panel controller stop operation of a first plurality of touch sensing elements of the plurality of touch sensing elements, wherein each of the first plurality of touch sensing elements overlaps the at least one antenna.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OV THE INVENTION

The following description is Of the best-contemplated mode of carrying out the invention. This description is made for the purpose of illustrating the general principles of the invention and should not be taken in a limiting sense. The scope of the invention is best determined by reference to the appended claims.

It is to be understood that the following disclosure provides many different embodiments, or examples, for implementing different features of the application. Specific examples of components and arrangements are described below to simplify the present disclosure. These are, of course, merely examples and are not intended to be limiting. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

Figure 1:
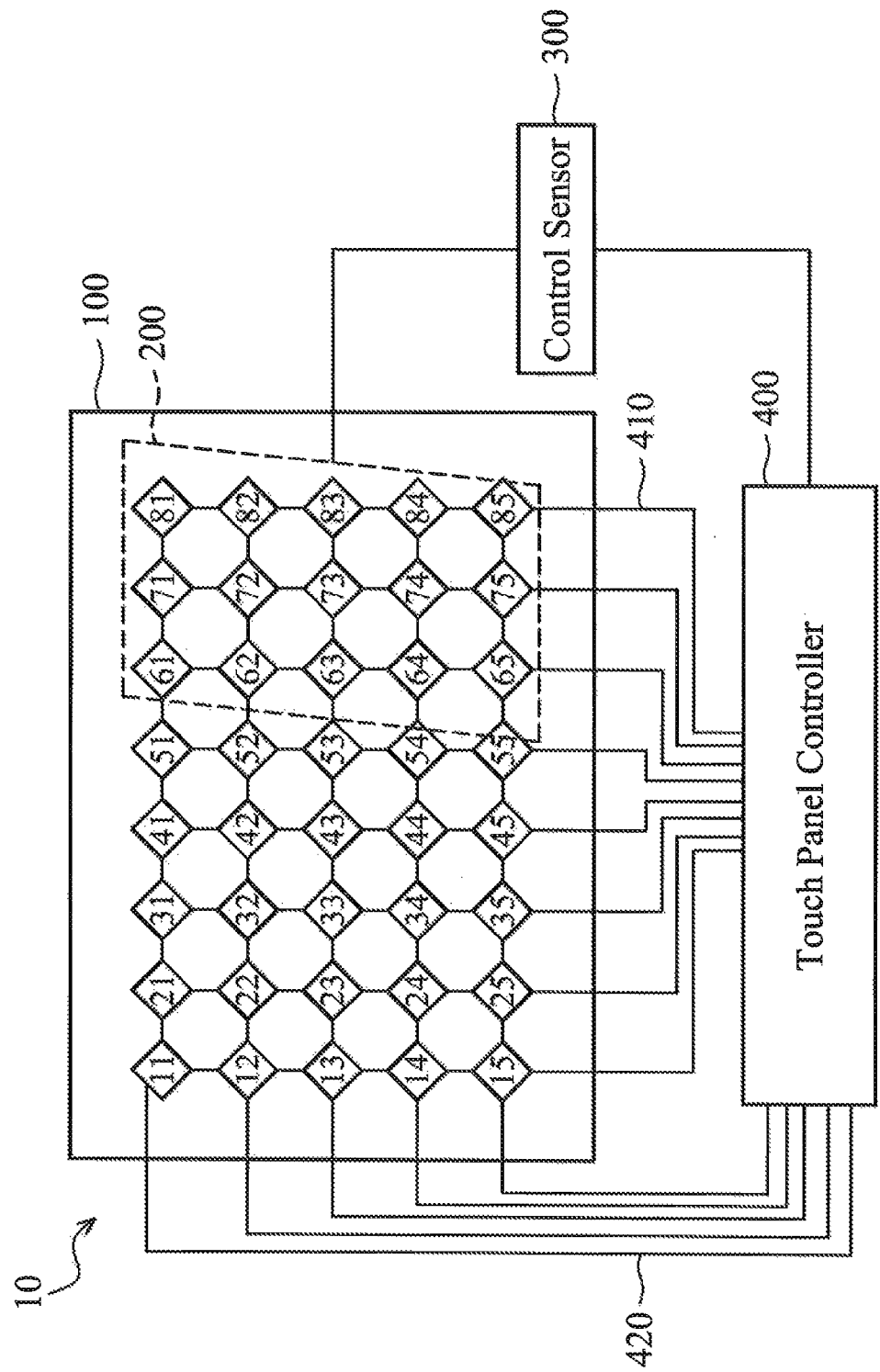
FIG. 1 is a block diagram of a touch panel according to an embodiment of the invention.

FIG. 1 is a block diagram of a touch panel 10 according to an embodiment of the invention. The touch panel 10 comprises a touch sensing structure 100, an antenna 200, a control sensor 300, a touch panel controller 400 and metal lines 410 and 420. The touch sensing structure 100 comprises a plurality of touch sensing elements 11~15, 21~25 . . . 81~85 for performing touch sensing. The touch panel controller 400 is coupled to the touch sensing structure 100 though the metal lines 410 and 420 and controls operation of the touch sensing structure 100 through the metal lines 410 and 420. For example, the touch panel controller 400 transmits scan signals sequentially to the touch sensing elements through the metal lines 420 to drive the touch sensing elements. After a touch event occurring on the touch panel 10 is sensed, a touch sensing element which corresponds to a position (or a region) where the touch event occurs transmits a sensing signal to the touch panel controller 400 through a corresponding one of the metal lines 410. The touch panel controller 400 determines the coordinate of the touch event and operation to which the touch event corresponds according to the received sensing signal. The antenna 200 can be a near filed communication (NFC) antenna, a Bluetooth antenna, a radio frequency identification (RFID) antenna, and so on.

Figure 2:
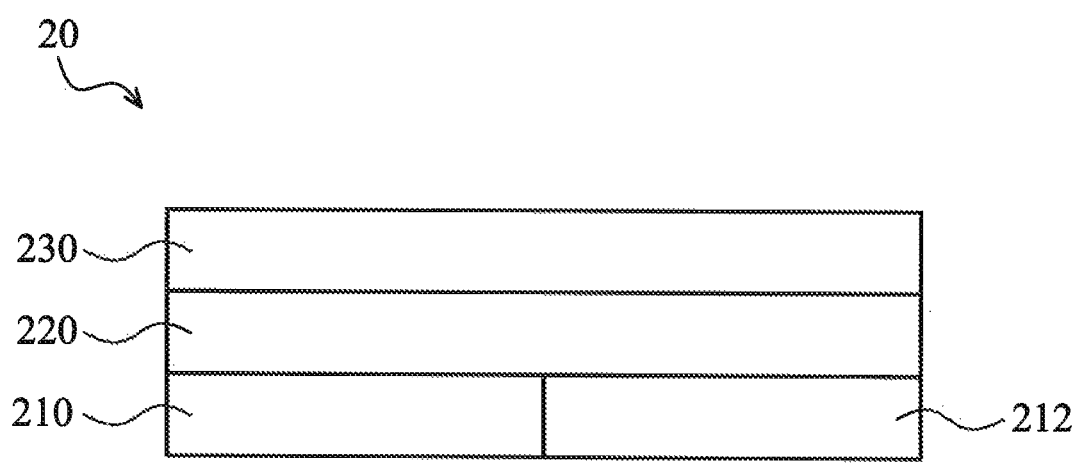
FIG. 2 is a cross-section block diagram of a touch panel according to an embodiment of the invention.

FIG. 2 is a cross-section block diagram of a touch panel 20 according to an embodiment of the invention. The touch panel 20 comprises a touch sensing structure 220, a metal layer 210, an antenna 212 which is in the same layer as the metal layer 210 and has the same material as the metal layer 210, and a cover layer 230. The metal layer 210 comprises, for example, the metal lines 410 and 420 in FIG. 1. In an example, the touch sensing structure 220 comprises a substrate, a first patterned conductive layer configured on the substrate, a dielectric layer configured on the first patterned conductive layer and a second patterned conductive layer configured on the dielectric layer. The first patterned conductive layer comprises a plurality of first sensing electrodes that form a plurality of first electrode strings. The second patterned conductive layer comprises a plurality of second sensing electrodes that forma plurality of second electrode strings. The plu ality of first sensing electrodes and the plurality of second sensing electrodes are equal to the touch sensing elements in FIG. 1. The plurality of first sensing electrodes and the plurality of second sensing electrodes are coupled to the touch panel controller through the metal lines. Therefore, the configuration described above is able to reduce the space of the configuration of the antenna. It should be noted that FIG. 2 is an example, and the invention is not limited thereto. For example, the antenna can be in a layer different from the metal layer, and the antenna can have a material different from that of the metal layer. In addition, the antenna doesn't have to be configured exactly under the touch sensing structure.

As shown in FIG. 1, the control sensor 300 is coupled to the antenna 200 and the touch panel controller 400 to detect whether the antenna 200 is going to start operating. In an example, the control sensor 300 is a distance detector for detecting whether a device capable of communicating with the antenna 200, such as an NFC tag, is approaching the antenna. If a device capable of communicating with the antenna 200 is approaching the antenna, the antenna is going to start operating. In another example, the control sensor is a power sensor for detecting whether there is a device to communicate with the antenna 200 based on changes in power. For example, when a turned-on NFC device is approaching the antenna 200, the control sensor can detect changes in power caused by the approaching of the turned-on NFC device, which means that the NFC device is to communicate with the antenna 200, and thus the antenna is going to start operating. In addition, the control sensor 300 can also be a pressure sensor, a thermal sensor, an acoustic wave sensor, and so on. Furthermore, the control sensor 300 can be a user interface which receives a command to start operating the antenna 200 through a pressed hot key or a turned-on predetermined application program.

When the control sensor 300 detects that the antenna 200 is going to start operating, the control sensor 300 transmits a control signal to the touch panel controller 400 to inform the touch panel controller 400 that the antenna 200 is going to start operating. The touch panel controller 400 stops operation of touch sensing elements 61~65, 71~75 and 81~85, which correspond to the position of the antenna 200 (that is, the touch sensing elements 61~65, 71~75 and 81~85 overlap the antenna 200) according to the control signal. In other words, the touch panel controller 400 stops driving the touch sensing elements 71~75 and 81~85 and stops touch sensing of the touch sensing elements 61~65, 71~75 and 81~85. Therefore, when the antenna is operating, a touch event occurring on positions of the touch sensing elements 61~65, 71~75 and 81~85 is not able to be sensed. In one example, the control signal comprises the position of the antenna 200, and thus the touch panel controller 400 can obtain the position of the antenna 200 from the control signal transmitted by the control sensor 300 and stop operation of the touch sensing elements overlapping the antenna 200 based on the position of the antenna 200. In another example, information of the touch sensing elements overlapping the antenna 200 is previously stored in the touch panel controller 400, and thus, after receiving the control signal, the touch panel controller 400 stops operation of the touch sensing elements indicated by the stored information, that is, the touch sensing elements overlapping the antenna 200, based on the stored information.

After the operation of the touch sensing elements 61~65, 71~75 and 81~85 is stopped, the antenna 200 can receive communication signals from or transmit communication signals to an external communication device. After the antenna 200 receives or transmits the communication signal, the control sensor 300 determines whether the antenna 200 stops operating, that is, the control sensor 300 determines whether or not the antenna stops receiving or transmitting the communication signals. If the antenna 200 stops operating, the control sensor 300 informs the touch panel controller 400 that the antenna 200 stops operating so as to make the touch panel controller 400 re-activate the stopped touch sensing elements 61~65, 71~75 and 81~85. If the antenna 200 doesn't stop operating, the touch panel controller 400 keeps stopping the operation of the touch sensing elements 61~65, 71~75 and 81~85.

In another embodiment, before the touch panel eaves the factory, all touch sensing elements can be divided into varying touch sensing element arrays based on the position of the antenna. For example, in FIG. 1, touch sensing elements 11~15, 21~25, 31~35, 41~45 and 51~55 belong to a first touch sensing element array and touch sensing, elements 61~65, 71~75 and 81~85 belong to a second touch sensing element array. A correspondence relationship between the touch sensing element arrays and the antenna is stored in the touch panel controller 400. Therefore, when the antenna 200 starts operating, the touch panel controller 400 can stop operation of the second touch sensing element array through a corresponding array control circuit based on the correspondence relationship. In still another embodiment, the touch panel may comprise at least two antennas. As described. above, a correspondence relationship between touch sensing element arrays and antennas can be stored in the touch panel controller. Array control circuits in the touch panel controller control the touch sensing element arrays according to starts and stops of operation of the antennas and the correspondence relationship. In other words, the array control circuits in the touch panel controller stops a touch sensing element array corresponding to an antenna starting operating and reactivate a touch sensing element array corresponding to a stopped antenna.

Figure 3:
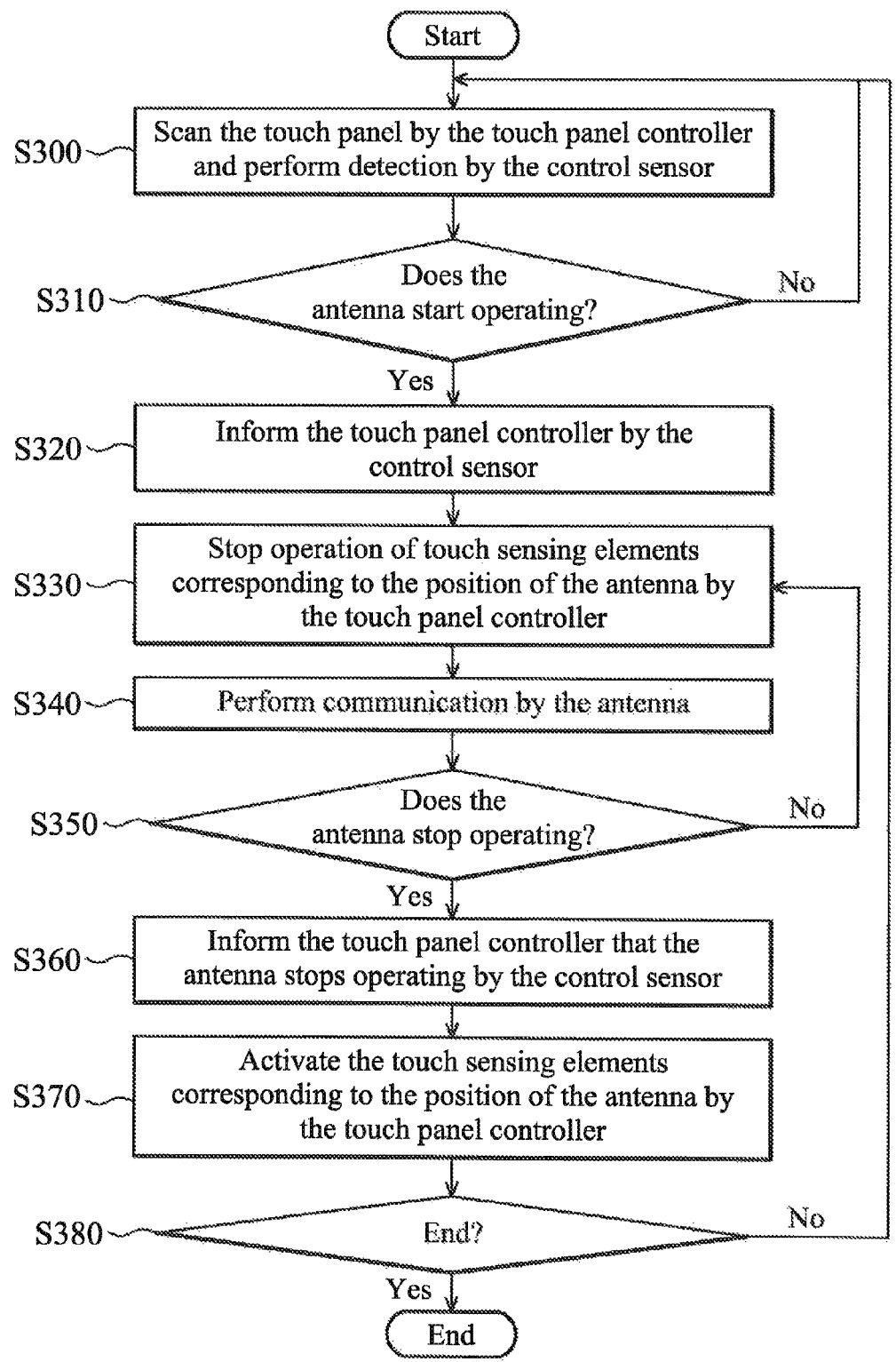
FIG. 3 is a flowchart of a control method of a touch panel according to an embodiment of the invention.

FIG. 3 is a flowchart of a control method of a touch panel according to an embodiment of the invention. The control method is applied to such as the touch panel 10 in FIG. 1.

As shown in FIG. 3, in step S300, the touch panel controller scans the touch panel and the control sensor performs detection. In other words, the whole touch sensing structure normally performs touch sensing and the control sensor monitors whether there is an event inducing the antenna to start operating at any time. In step S310, the control sensor determines whether the antenna starts operating. As described above, the control sensor can be a distance detector for detecting whether a device capable of communicating with the antenna is approaching the antenna, and if so, the antenna starts operating. In addition, the control sensor can be a power sensor for detecting whether there is a device to communicate with the antenna based on changes in power, and if so, the antenna starts operating.

If the antenna doesn't start operating (step S310: No), the control method proceeds back to the step S300. If the antenna starts opera ng (step S310; Yes), in step S320, the control sensor informs the touch panel controller that the antenna starts operating, and then the touch panel controller stops operation of touch sensing elements corresponding to the position of the antenna in step S330, that is, the touch panel controller stops operation of touch sensing elements overlapping the antenna, such as the touch sensing elements 61~65, 71~75 and 81~85 in FIG. 1. Next, in step S340, the antenna performs communication. In one example, when the control sensor informs the touch panel controller that the antenna starts operating, the control sensor also informs the touch panel controller of the position of the antenna. Therefore, the touch panel controller can stop the operation of the touch sensing elements corresponding to the position of the antenna based on the position of the antenna. In another example, information of the touch sensing elements corresponding to the position of the antenna is previously stored in the touch panel controller. Therefore, when receiving the notification from the control sensor, the touch panel controller can stops the operation of the touch sensing elements corresponding to the position of the antenna based on the stored information.

After the antenna performs communication, in step S350, the control sensor determines whether the antenna stops operating. The control sensor may determine whether the antenna stops operating by determining whether the device originally communicating with the antenna is leaving the antenna, by changes in power, or by directly determining the status of the antenna. If the antenna doesn't stop operating (step S350: No), the control method proceeds back to the step S330, and the touch panel controller keeps stopping the operation of the touch sensing elements corresponding to the position of the antenna. If the antenna stops operating (step S350: Yes), the control sensor informs the touch panel controller that the antenna stops operating in step S360, and then the touch panel controller re-activate the operation of the touch sensing elements corresponding to the position of the antenna in step S370. After that, in step S380, it is determined whether the control method of the touch panel ends. If it is determined that the control method of the touch panel ends, the control method of the touch panel ends. If it is determined that the control method of the touch panel doesn't end, the control method proceeds back to the step S300 and keeps controlling the touch panel.

Figure 4:
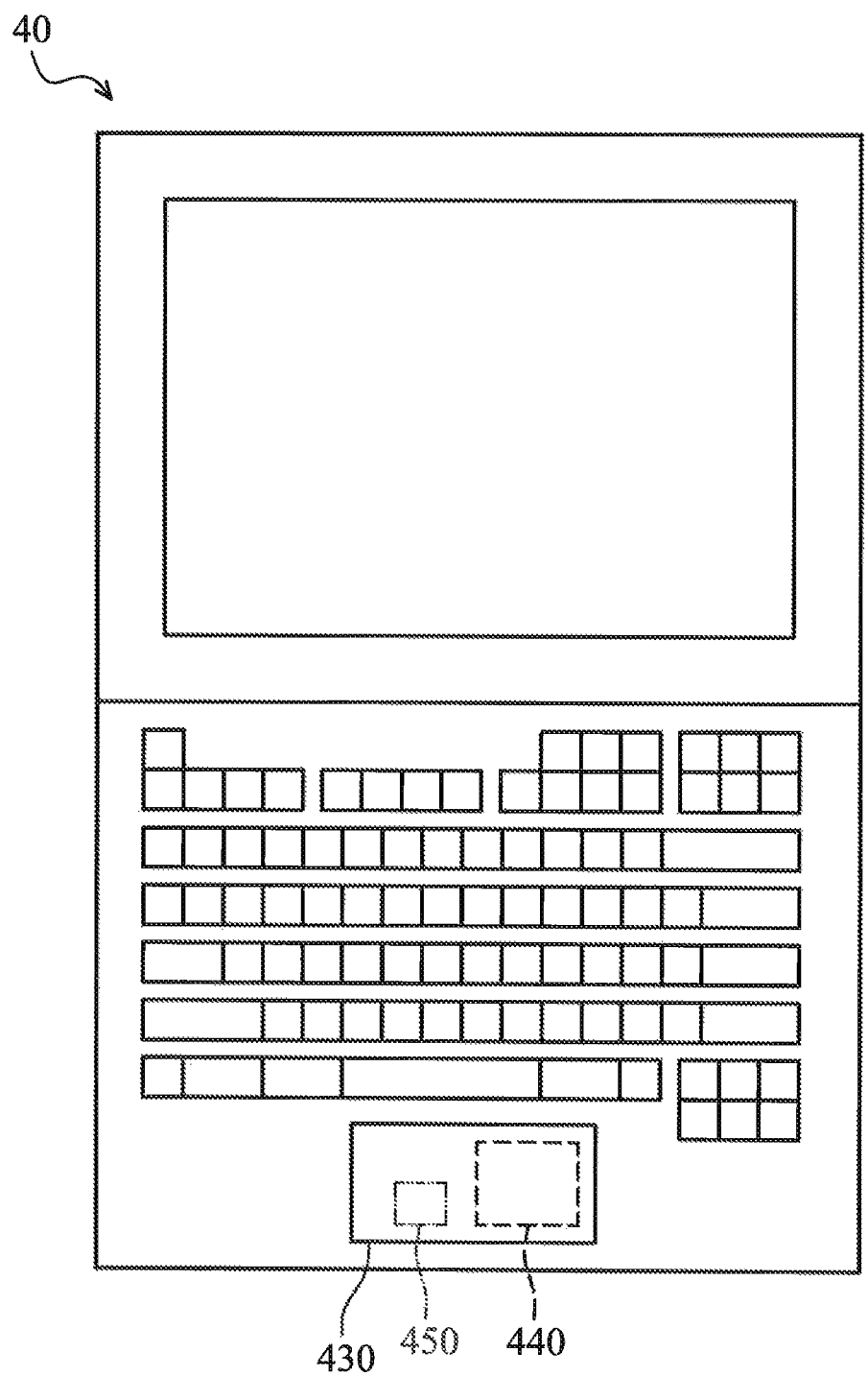
FIG. 4 is a block diagram of a notebook computer according to an embodiment of the invention.

FIG. 4 is a block diagram of a notebook computer 40 according to an embodiment of the invention. The notebook computer 40 comprises a touch panel 430 comprising an antenna 440 and a control sensor 450. The control sensor 450 is configured on a circuit board where a touch sensing structure is configured. The touch panel 430, the antenna 440 and the control sensor 450 are similar to the touch panel, the antenna and the control senSor described above, respectively, and will not be described again.

Figure 5:
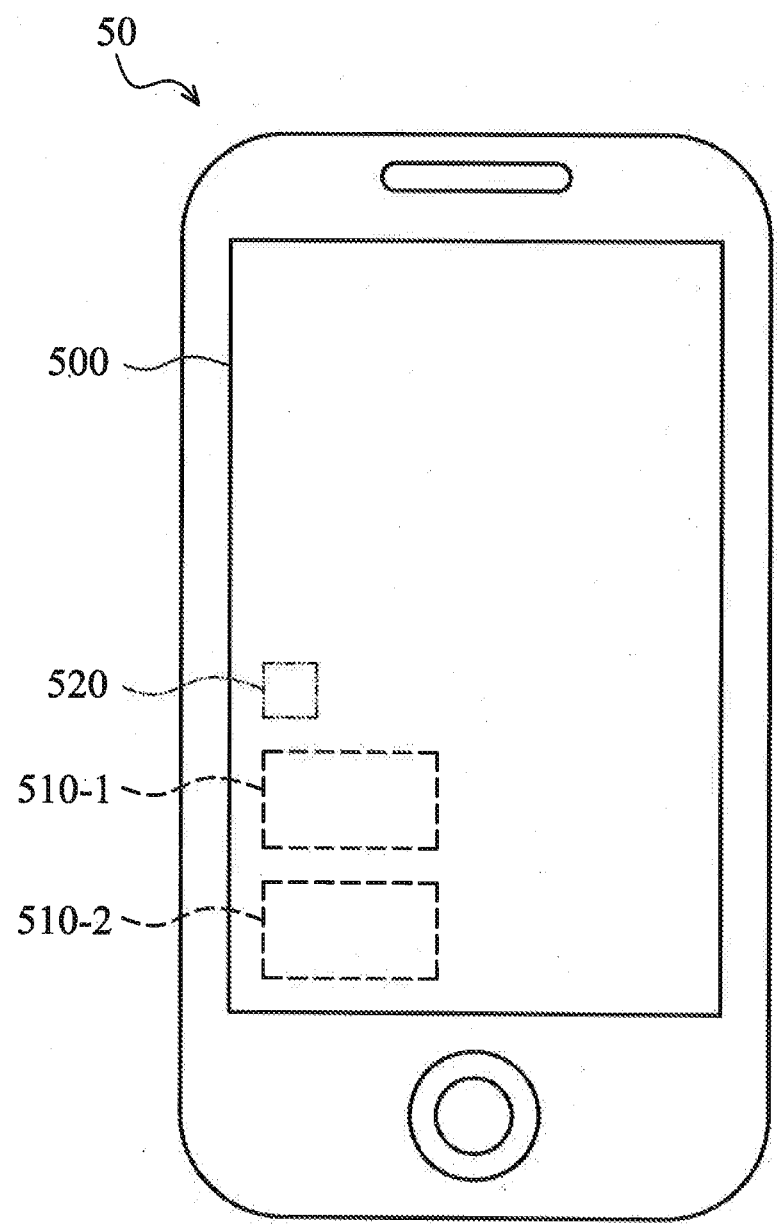
FIG. 5 is a block diagram of a mobile phone according to an embodiment of the invention.

The touch panel described above and a display screen can be combined to form a touch display screen. FIG. 5 is a block diagram of a mobile phone 50 according to an embodiment of the invention. The mobile phone 50 comprises a touch display screen 500 including the touch panel described above. The touch display screen 500 comprises antennas 510-1 and 510-2 and a control sensor 520. A touch sensing structure included in the touch display screen 500, the antennas 510-1 and 510-2 and the control sensor 520 are similar to the touch sensing structure, the antenna and the control sensor described above, respectively, and will not be described again. As shown in FIG. 5, the touch panel comprises two antennas. Before the touch panel leaves the factory, touch sensing elements can be divided into varying touch sensing element arrays based on positions of the antennas. For example, touch sensing el its overlapping the antenna 510-1 belong to a first touch sensing element array, touch sensing elements overlapping the antenna 510-2 belong to a second touch sensing element array, and the rest touch sensing elements belong to a third touch sensing element array. A correspondence relationship between the touch sensing element arrays and the antennas 510-1 and 510-2 is stored in the touch panel controller. When the control sensor informs the touch panel controller that at least one of the antennas 510-1 and 510-2 starts operating, the touch panel controller stops operation of a touch sensing element array corresponding to the operating antenna based on the stored correspondence relationship.

It should be noted that the number of antennas and the number of the control sensor are only exemplary, and the invention is not limited thereto. Furthermore, the control sensor has to be configured near the antenna. The control sensor can be configured on a circuit board where the touch sensing structure is configured or a circuit board different from that of the touch sensing structure.

As described above, the disclosed touch panel and the disclosed control method thereof use a control sensor to detect whether an antenna combined with a touch panel is going to start operating and whether an antenna combined with the touch panel stops operating and use array control to stop operation of touch sensing elements corresponding to an antenna starting operating and re-activate operation of touch sensing elements corresponding to a stopped antenna so as to avoid communication interference to the communication in the touch panel with both touch sensing and antenna communication functions.

Methods and systems of the present disclosure, or certain aspects or portions of embodiments thereof, may take the form of a program code (i.e., instructions) embodied in media, such as floppy diskettes, CD-ROMS, hard drives, firmware, or any other non-transitory machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch panel control method, applied to a touch panel comprising at least one antenna and a touch sensing structure having a plurality of touch sensing elements, wherein the touch sensing elements are divided into a first touch sensing element array and a second touch sensing element array, comprising:
    transmitting a scan signal to at least one of the plurality of touch sensing elements;
    receiving a sensing signal sensed by at least one of the plurality of touch sensing elements; and
    detecting whether the at least one antenna starts operating by a control sensor, and if so, stopping operation of the second touch sensing element array, wherein the second touch sensing element array overlaps the at least one antenna, and the first touch sensing element array does not overlap the at least one antenna.

2. The touch panel control method as claimed in claim 1, further comprising:
after the operation of the second touch sensing element array is stopped, receiving or transmitting communication signals through the at least one antenna.

3. The touch panel control method as claimed in claim 2, further comprising:
after the communication signals are received or transmitted through the at least one antenna, determining whether the at least one antenna stops operating, if so, re-activating the operation of the second touch sensing element array, and if not, keeping stopping the operation of the second touch sensing element array.

4. The touch panel control method as claimed in claim 1, wherein the control sensor is a distance detector for detecting whether a device capable of communicating with the at least one antenna is approaching the at least one antenna, and if so, the at least one antenna starts operating.

5. The touch panel control method as claimed in claim 1, wherein the control sensor is a power sensor for detecting whether there is a device to communicate with the at least one antenna based on changes in power, and if so, the at least one antenna starts operating.

6. A touch panel, comprising:
a touch sensing structure, comprising a plurality of touch sensing elements, wherein the touch sensing elements are divided into a first touch sensing element array and a second touch sensing element array;
at least one antenna;
a touch panel controller, coupled to the touch sensing structure, transmitting a scan signal to at least one of the plurality of touch sensing elements and receiving a sensing signal sensed by at least one of the plurality of touch sensing elements; and
a control sensor, coupled to the at least one antenna and the touch panel controller, detecting whether the at least one antenna starts operating, wherein when the control sensor detects that the at least one antenna starts operating, the control sensor transmits a control signal to the touch panel controller to make the touch panel controller stop operation of the second touch sensing element array, wherein the second touch sensing element array overlaps the at least one antenna, and the first touch sensing element array does not overlap the at least one antenna.

7. The touch panel as claimed in claim 6, wherein the control sensor is a distance detector for detecting whether a device capable of communicating with the at least one antenna is approaching the at least one antenna, and if so, the at least one antenna starts operating.

8. The touch panel as claimed in claim 6, wherein the control sensor is a power sensor for detecting whether there is a device to communicate with the at least one antenna based on changes in power, and if so, the at least one antenna starts operating.

9. The touch panel as claimed in claim 6, wherein when the at least one antenna starts operating, the touch panel controller stops the operation of the second touch sensing element array and maintains operation of the first touch sensing element array.

* * * * *